(12) United States Patent
Ishioka (10) Patent No.: US 11,066,336 B2
(45) Date of Patent: Jul. 20, 2021

(54) HONEYCOMB STRUCTURE

(71) Applicant: NGK Insulators, Ltd., Nagoya (JP)

(72) Inventor: Tomohiro Ishioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 208 days.

(21) Appl. No.: 16/289,989

(22) Filed: Mar. 1, 2019

(65) Prior Publication Data

US 2019/0300448 A1    Oct. 3, 2019

(30) Foreign Application Priority Data

Mar. 27, 2018    (JP) .............................. JP2018-059933

(51) Int. Cl.
| | | |
|---|---|---|
| *B01J 35/04* | (2006.01) | |
| *B01D 46/24* | (2006.01) | |
| *C04B 38/00* | (2006.01) | |
| *B01D 53/94* | (2006.01) | |
| *C04B 35/565* | (2006.01) | |
| *C04B 35/636* | (2006.01) | |
| *C04B 35/626* | (2006.01) | |
| *B01J 37/02* | (2006.01) | |

(52) U.S. Cl.
CPC ...... *C04B 38/0019* (2013.01); *B01D 46/2466* (2013.01); *B01D 53/94* (2013.01); *B01J 35/04* (2013.01); *B01J 37/0215* (2013.01); *C04B 35/565* (2013.01); *C04B 35/62655* (2013.01); *C04B 35/6365* (2013.01); *B01D 2046/2481* (2013.01); *B01D 2255/9155* (2013.01); *B01D 2279/30* (2013.01); *C04B 2235/3826* (2013.01); *C04B 2235/428* (2013.01); *C04B 2235/606* (2013.01); *C04B 2235/6021* (2013.01); *C04B 2235/656* (2013.01)

(58) Field of Classification Search
None
See application file for complete search history.

(56) References Cited

U.S. PATENT DOCUMENTS

| | | | |
|---|---|---|---|
| 2003/0053940 A1* | 3/2003 | Harada | ................. C04B 37/001 422/180 |
| 2003/0138596 A1* | 7/2003 | Harada | .............. B01D 39/2068 428/116 |
| 2005/0214503 A1 | 9/2005 | Sakamoto | |

(Continued)

FOREIGN PATENT DOCUMENTS

| | | |
|---|---|---|
| DE | 10 2019 202 927 A | 9/2019 |
| JP | 2003-340224 A1 | 12/2003 |

OTHER PUBLICATIONS

German Office Action (with English translation), German Application No. 10 2019 204 231.7, dated Oct. 27, 2020 (7 pages).

*Primary Examiner* — David Sample
*Assistant Examiner* — Elizabeth Collister
(74) *Attorney, Agent, or Firm* — Burr & Brown, PLLC (57) ABSTRACT

A honeycomb structure includes honeycomb segments, bonding layers and a circumferential wall. The bonding layers include bottomed-hollow voids which extend toward an internal side in an axial direction from an end face of the honeycomb structure and which are formed at at least one of intersections, and a ratio of a depth of each void in the axial direction to a length of each honeycomb segment in the axial direction is 5% or more.

20 Claims, 9 Drawing Sheets (56) References Cited

U.S. PATENT DOCUMENTS

2009/0246452 A1\* 10/2009 Ogura .................... B28B 19/00
 428/116
2014/0093436 A1\* 4/2014 Nishio ................. F01N 3/0222
 422/171
2019/0284101 A1 9/2019 Yuki \* cited by examiner

HONEYCOMB STRUCTURE

The present application is an application based on JP 2018-059933 filed on Mar. 27, 2018 with Japan Patent Office, the entire contents of which are incorporated herein by reference.

BACKGROUND OF THE INVENTION

Field of the Invention

The present invention relates to a honeycomb structure. More particularly, the present invention relates to a segmented-structure honeycomb structure in which a plurality of honeycomb segments are bonded with bonding layers.

Description of the Related Art

Exhaust gas emitted from various internal combustion engines such as a diesel engine includes a great deal of particulate matter such as dust, soot, and carbon particulates. For this reason, a purification device that purifies exhaust gas emitted from an automobile that uses a diesel engine as a power source employs a diesel particulate filter (DPF), for example. Hereinafter, particulate matter may be called "PM". Moreover, a diesel particulate filter may be called "DPF".

The DPF is commonly a structure that is sectioned by porous partition walls into a plurality of cells acting as fluid through channels and makes the porous partition walls configured to form the cells function as a filter by alternately plugging the open ends of the plurality of cells.

When the DPF continues to remove PM in the exhaust gas, the PM becomes deposited within the DPF and thus the purification efficiency is decreased and the pressure loss of the DPF is increased. Therefore, the purification device using the DPF needs to perform a "reproduction process" of combusting the deposited PM by using high-temperature exhaust gas generated from the diesel engine.

In the case of the reproduction process described above, because a high thermal stress is generated in the DPF due to the combustion heat of the PM, measures to prevent the breakage of the DPF are necessary. Particularly, a passenger car and the like have a tendency to increase the frequency of reproduction process and thus measures to prevent the breakage of the DPF are particularly important.

Conventionally, as a technology for preventing the breakage of such the DPF, there has been proposed a technology for bonding a plurality of segments each having honeycomb structure via bonding materials without manufacturing DPF having one honeycomb structure (see Patent Document 1). Hereinafter, "a segment having honeycomb structure" may be called "a honeycomb segment". Moreover, "a honeycomb structure in which a plurality of honeycomb segments are bonded with bonding layers" may be called "a segmented-structure honeycomb structure". In addition, a honeycomb structure to be contrasted with such the segmented-structure honeycomb structure includes a honeycomb structure in which all partition walls constituting the honeycomb structure form one continuous structural object. The "honeycomb structure in which all partition walls form one continuous structural object" may be called a "monolithic honeycomb structure".

[Patent Document 1] JP-A-2003-340224

The segmented-structure honeycomb structure has a problem that the total thermal stress of the honeycomb structure can be absorbed but cracks etc. are easy to occur in the bonding layers of the circumferential portion of the honeycomb structure. For example, the honeycomb structure for DPF may load an oxidation catalyst in order to promote the oxidation and combustion of PM during a reproduction process. When loading the oxidation catalyst, the honeycomb structure is coated with slurry including the oxidation catalyst and then is subject to heat treatment at high temperature to be baked, but cracks etc. may occur in the bonding layers of the circumferential portion during this heat treatment. Moreover, even in sudden temperature rising and sudden temperature falling of the exhaust gas generated during driving a vehicle, cracks etc. may occur in the bonding layers.

Recently, in large trucks etc. there is a tendency to switch from the DPF made of cordierite to the DPF made of SiC due to the request of downsizing etc. of DPF, and the adoption of the DPF made of large-sized SiC increases. The large-sized DPF has a problem that a temperature difference between the inside and outside of the DPF more easily occurs, and thus a crack easily occurs when loading a catalyst.

Moreover, in employing SiC, unified DPF obtained by unifying SCR and DPF loads a great deal of catalytic amount, and materials having low heat conduction with high porosity tend to be used as the materials of the DPF. Herein, "SCR" is an abbreviation of "Selective Catalytic Reduction: selective reduction NOx catalyst". Because the high-porosity materials have characteristically low heat conduction, using the high-porosity materials as the material of DPF leads to a problem that a temperature difference between the inside and outside of DPF easily occurs, and thus a crack easily occurs when loading a catalyst.

The present invention has been achieved in view of the problems of the above conventional technology. According to the present invention, there is provided a honeycomb structure that can effectively suppress the extension of a crack occurring in bonding layers for bonding a plurality of honeycomb segments.

SUMMARY OF THE INVENTION

According to the present invention, there is provided a honeycomb structure to be described below.

According to a first aspect of the present invention, a honeycomb structure is provided including: a plurality of prismatic columnar honeycomb segments; bonding layers that bond side faces of the plurality of honeycomb segments with respect to each other; and a circumferential wall that is disposed to surround the plurality of honeycomb segments bonded with the bonding layers in a state where the plurality of honeycomb segments are arrayed in a grid pattern, wherein each of the honeycomb segments includes porous partition walls disposed to surround a plurality of cells extending from an inflow end face to an outflow end face in an axial direction and a segmented outer wall disposed to surround the partition walls, an end of each of the cells in each of the honeycomb segments is plugged by a plugging portion at any one of the inflow end face and the outflow end face, the bonding layers include bottomed-hollow voids which extend toward an internal side in the axial direction from the inflow end face or the outflow end face and which are formed at at least one of intersections that bond the honeycomb segments in the grid pattern, and a ratio of a depth of each void in the axial direction to a length of each honeycomb segment in the axial direction is 5% or more.

According to a second aspect of the present invention, the honeycomb structure according to the first aspect is provided, wherein a remaining portion of each bonding layer at each intersection in which each void is formed, other than each void, has a length of 1.5 mm or more in the axial direction.

According to a third aspect of the present invention, the honeycomb structure according to the first or second aspects is provided, wherein the voids are formed at at least one of the intersections which are located at radially outermost circumference on the inflow end face or the outflow end face of the honeycomb structure.

According to a fourth aspect of the present invention, the honeycomb structure according to the third aspect is provided, wherein the voids are formed at all of the intersections on extended lines that linearly extend along the bonding layers from the intersections that are the closest to the centroid of the inflow end face or the outflow end face of the honeycomb structure.

According to a fifth aspect of the present invention, the honeycomb structure according to any one of the first to fourth aspects is provided, wherein a ratio of a size of an open end of each void to a width of each bonding layer on the inflow end face or the outflow end face of the honeycomb structure is 10 to 140%.

According to a sixth aspect of the present invention, the honeycomb structure according to any one of the first to fifth aspects is provided, wherein a width of each bonding layer on the inflow end face or the outflow end face of the honeycomb structure is 0.5 to 2.0 mm.)

The honeycomb structure of the present invention can effectively suppress extension of cracks at the bonding layer to bond a plurality of honeycomb segments. Specifically the bonding layer to bond the honeycomb segments in a grid pattern has a bottomed-hollow void at at least one of intersections, and this void effectively suppresses extension of cracks in the bonding layer.

DETAILED DESCRIPTION OF THE PRESENT INVENTION

Hereinafter, exemplary embodiments of the present invention will be explained, but the present invention is not limited to the following embodiments. Therefore, it should be understood that those in which modifications, improvements, etc. have been appropriately added to the following embodiments based on ordinary knowledge of those skilled in the art without departing from the spirit of the present invention are within the scope of the present invention.

(1) Honeycomb Structure

One embodiment of a honeycomb structure according to the present invention is a honeycomb structure 100 that includes a plurality of honeycomb segments 4, bonding layers 14, and a circumferential wall 13 as shown in FIGS. 1 to 4. The honeycomb structure 100 according to the present embodiment is the so-called segmented-structure honeycomb structure 100. The honeycomb structure 100 according to the present embodiment can be preferably used as a trapping filter for removing particulate matter contained in exhaust gas.

Figure 1:
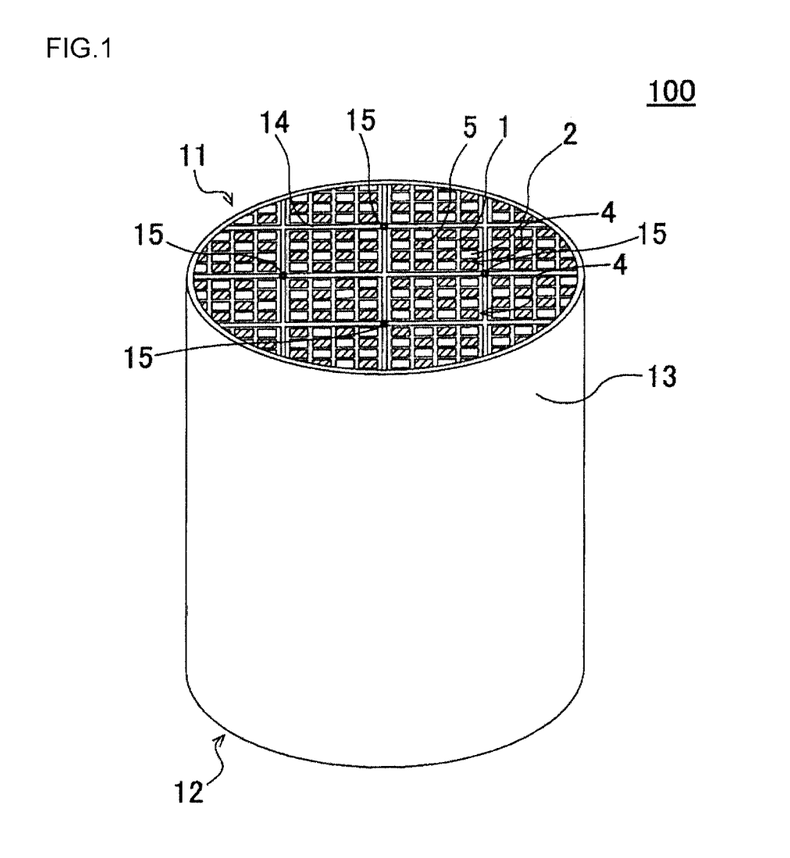
FIG. 1 is a perspective view schematically showing one embodiment of the honeycomb structure of the present invention.
Figure 2:
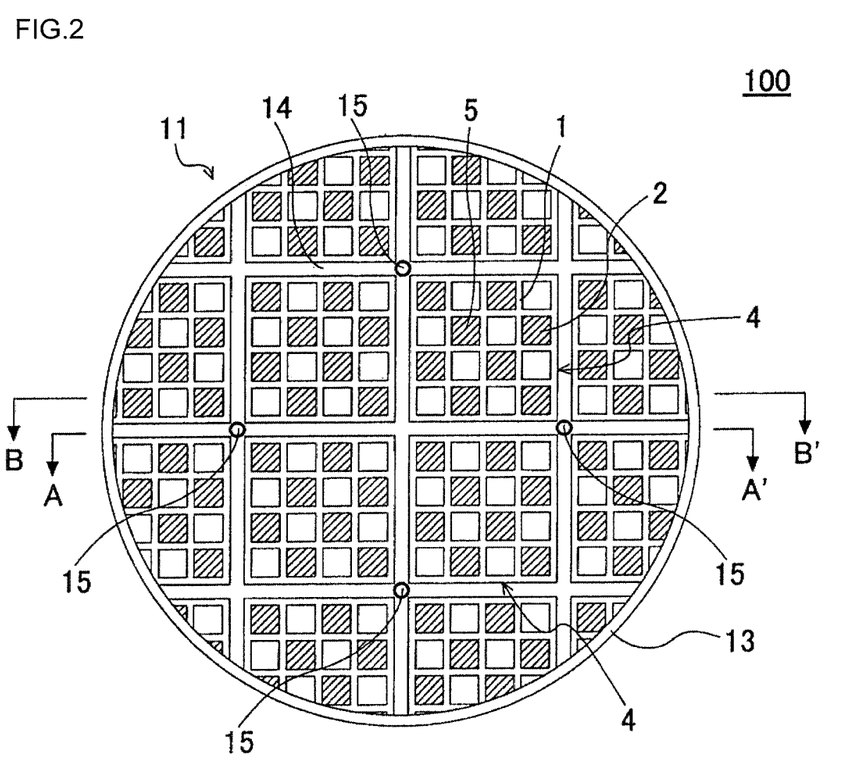
FIG. 2 is a plan view showing the inflow end face of the honeycomb structure of FIG. 1.
Figure 3:
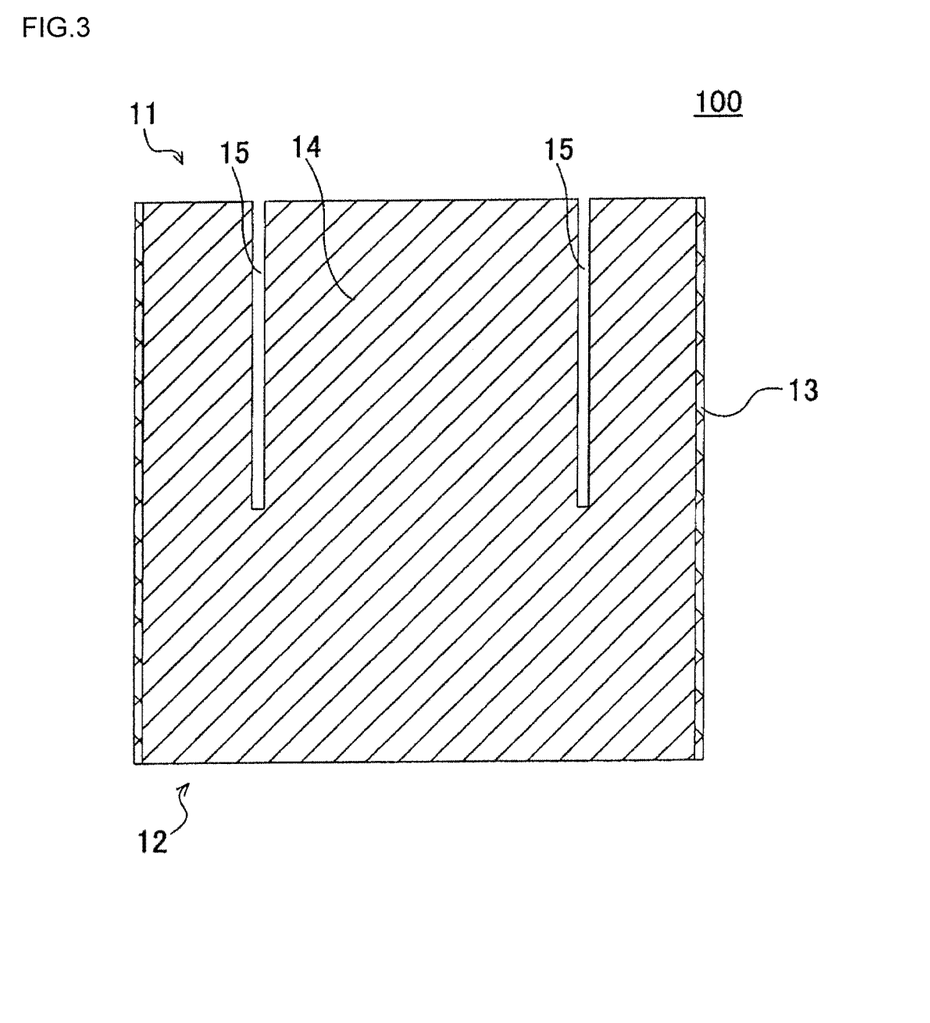
FIG. 3 is a schematic cross-sectional view taken along the line A-A' of FIG. 2.
Figure 4:
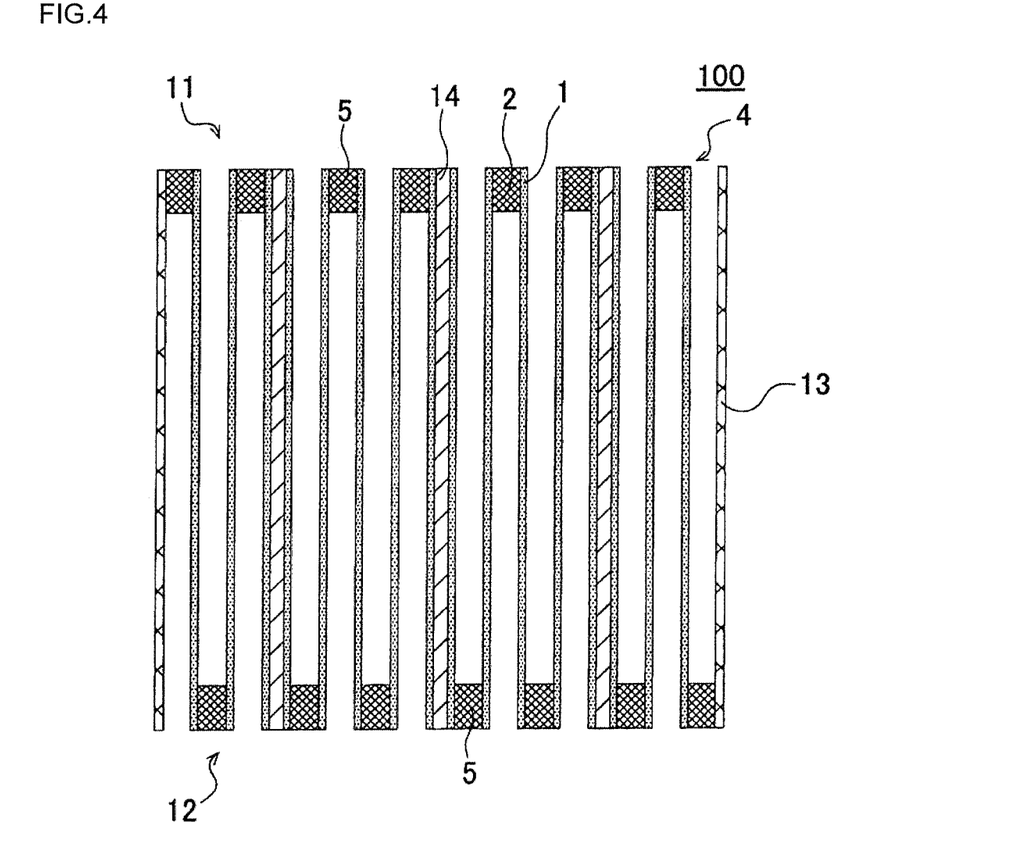
FIG. 4 is a schematic cross-sectional view taken along the line B-B' of FIG. 2.

Herein, FIG. 1 is a perspective view schematically showing one embodiment of the honeycomb structure according to the present invention. FIG. 2 is a plan view showing an inflow end face of the honeycomb structure shown in FIG. 1. FIG. 3 is a cross-sectional view schematically showing a cross section viewed from the A-A' line in FIG. 2. FIG. 4 is a cross-sectional view schematically showing a cross section viewed from the B-B' line in FIG. 2.

Each of the honeycomb segments 4 includes porous partition walls 1 disposed to surround a plurality of cells 2 that extends from an inflow end face 11 up to an outflow end face 12. Each of the honeycomb segments 4 is configured to further include a segmented outer wall on the circumferential portion of the partition walls 1 so that its overall shape becomes prismatic columnar for example. In addition, in the present invention, each of the cells 2 means a space that is surrounded by the partition walls 1.

The honeycomb structure 100 includes the plurality of honeycomb segments 4 and the side faces of the plurality of honeycomb segments 4 are bonded via the bonding layers 14. Among the plurality of honeycomb segments 4, the honeycomb segments 4 arranged in the central portion of the honeycomb structure 100 have a "prismatic columnar" shape in which a direction from the inflow end face 11 toward the outflow end face 12 is defined as an axial direction. On the other hand, among the plurality of honeycomb segments 4, the honeycomb segments 4 arranged in a circumferential portion that is in contact with the circumferential wall 13 have a pillar shape in which a portion of the honeycomb segment 4 formed in a prismatic columnar shape is ground along the shape of the circumferential wall 13. Hereinafter, in the present specification, an "axial direction" means a direction parallel to the direction of the honeycomb segments 4 from the inflow end face 11 toward the outflow end face 12 unless otherwise specified.

The bonding layers 14 are formed by a bonding material which bonds the side faces of the plurality of honeycomb segments 4 each other. Hereinafter, a bonded body in which the plurality of honeycomb segments 4 is bonded via the bonding layer 14 may be called a "honeycomb segment bonded body". In the honeycomb structure 100 according to the present embodiment, the honeycomb segment bonded body is formed by bonding the plurality of honeycomb segments 4 with the bonding layers 14 to be arranged in a grid pattern. The circumferential wall 13 is disposed to surround the outer circumference of the honeycomb segment bonded body.

In each of the cells 2 in each of the honeycomb segments 4, the end of one of the inflow end face 11 and the outflow end face 12 is plugged by a plugging portion 5. In other words, in each of the honeycomb segments 4, the plugging portions 5 are disposed in open ends of the predetermined cells 2 in the inflow end face 11 and in open ends of the residual cells 2 other than the predetermined cells 2 in the outflow end face 12.

Hereinafter, the cells 2 (i.e., the predetermined cells 2 described above) for which the plugging portions 5 are disposed in their open ends in the inflow end face 11 of each of the honeycomb segments 4 may be called "outflow cells". The cells 2 (i.e., the residual cells 2 described above) for which the plugging portions 5 are disposed in their open ends in the outflow end face 12 of each of the honeycomb segments 4 may be called "inflow cells".

The honeycomb structure 100 particularly has a main feature with respect to the configuration of the bonding layers 14 for bonding the honeycomb segments 4. That is, the bonding layers 14 have bottomed (i.e., having a bottom)-hollow voids 15 which extend toward an internal side in the axial direction from the inflow end face or the outflow end face and which are formed at at least one of intersections that bond the honeycomb segments in the grid pattern. Note here that the "intersections" of the bonding layer 14 mean, when the bonding layer 14 bonds the plurality of honeycomb segments 4 in a grid pattern as shown in FIG. 2, intersections of the bonding layer 14 that extends vertically and horizontally in the inflow end face 11, for example. In the honeycomb structure 100 of the present embodiment, a ratio of a depth of each void 15 in the axial direction to a length of each honeycomb segment 4 in the axial direction is 5% or more. Hereinafter the depth of each void 15 in the axial direction may be simply called a "void depth" of each void 15. The ratio of the depth of each void 15 in the axial direction to the length of each honeycomb segment 4 in the axial direction may be simply called a "ratio of void depth" of each void 15.

The honeycomb structure 100 of the present embodiment can effectively suppress extension of cracks at the bonding layer 14. Specifically a void 15 of a predetermined void depth formed at at least one of the intersections of the bonding layer 14 can stop the extension of cracks generated at the bonding layer 14, and so the void 15 can effectively suppress the extension of cracks beyond the void. Such a void 15 formed at the intersections of the bonding layer 14 can effectively keep the bonding strength of the bonding layer 14 to bond the honeycomb segments 4. If the ratio of void depth of the void 15 is less than 5%, such a void 15 cannot have a sufficient effect of stopping cracks extended to the void 15. Preferably no void 15 of a predetermined void depth is formed at a part other than the intersections of the bonding layer 14, e.g., at a part where two honeycomb segments 4 bond at their side faces.

Figure 5:
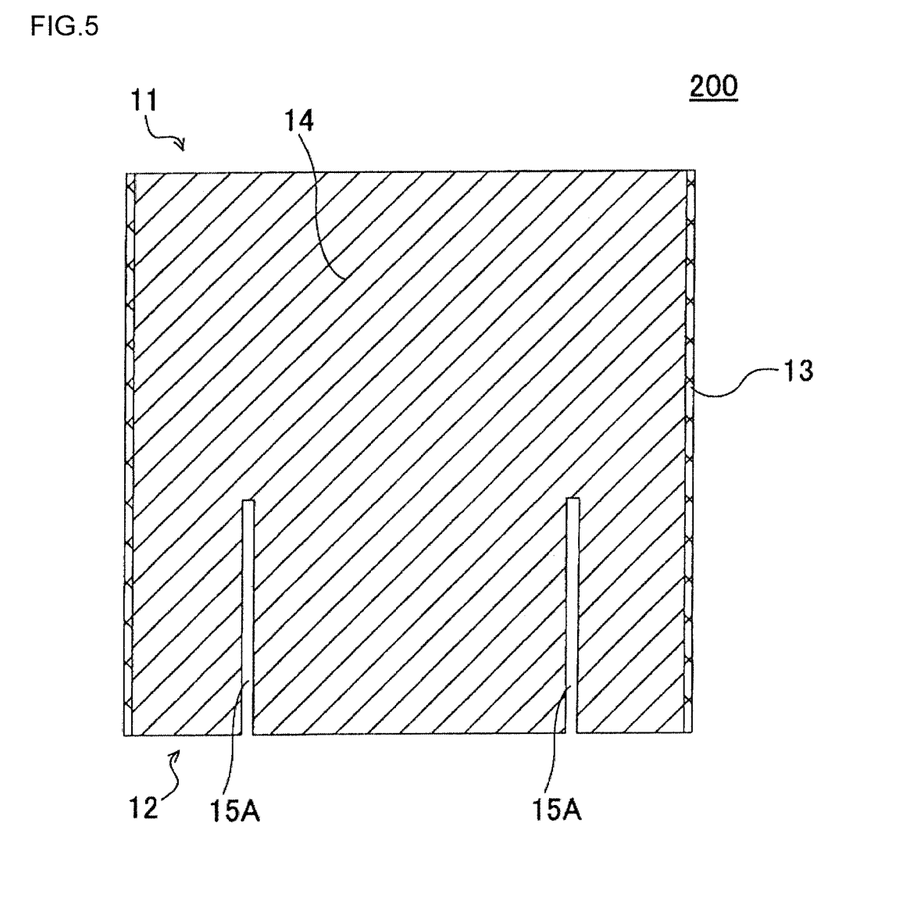
FIG. 5 is a cross-sectional view schematically showing another embodiment of the honeycomb structure of the present invention.

In the honeycomb structure 100 of FIG. 1 to FIG. 4, the voids 15 are formed to extend axially inward from the inflow end face 11. Note here that voids 15 may extend axially inward from any one of the inflow end face 11 and the outflow end face 12. In a honeycomb structure 200 of FIG. 5, for example, voids 15A extend axially inward from the outflow end face 12. FIG. 5 is a cross-sectional view schematically showing another embodiment of the honeycomb structure of the present invention. In the honeycomb structure 200 shown in FIG. 5, the same components as those of the honeycomb structure 100 shown in FIGS. 1 to 4 have the same reference numbers and their descriptions are omitted. The cross section shown in FIG. 5 shows a cross section corresponding to the cross section (i.e., the cross section shown in FIG. 3) viewed from the A-A' line in FIG. 2. Although not shown, voids may be formed at one intersection of the bonding layer so that the voids extend axially inward from both of the inflow end face and the outflow end face.

In the honeycomb structure 100 of FIG. 1 to FIG. 4, the voids 15 are formed at the intersections of the bonding layer 14 on the side of the inflow end face 11 that are located at the radially outermost circumference in the inflow end face 11. In this way, the voids 15 are preferably formed at at least one of intersections which are located at the radially outermost circumference on the side of the inflow end face 11 or of the outflow end face 12 of the honeycomb structure 100. Cracks are easily generated at the bonding layer 14 of the honeycomb structure 100 at positions close to the circumferential wall 13 of the honeycomb structure 100. Such cracks at positions close to the circumferential wall 13 extend inward of each end face of the honeycomb structure 100 along the bonding layer 14. The voids 15 at at least one of intersections located at the radially outermost circumference on the side of the inflow end face 11 or of the outflow end face 12 of the honeycomb structure 100 therefore can effectively suppress extension of the cracks generated at positions close to the circumferential wall 13. Voids 15 may be formed at intersections other than the intersections located at the radially outermost circumference.

The voids 15 are formed at, among the "intersections located at the radially outermost circumference" as stated above, all of the intersections on the extended lines that linearly extend along the bonding layer 14 from the intersections that are the closest to the centroid of the inflow end face 11 of the honeycomb structure 100. Such a configuration can more effectively suppress extension of cracks on the inflow end face 11 of the honeycomb structure 100. In this way, the voids 15 are preferably formed at all of the intersections on the extended lines that linearly extend along the bonding layer 14 from the intersections that are the closest to the centroid of the inflow end face 11 or the outflow end face 12 of the honeycomb structure 100. Preferably the voids 15 are preferentially formed at "intersections located at the radially outermost circumference" that are at the same time "on the extended lines that linearly extend along the bonding layer 14 from the intersections that are the closest to the centroid". The "centroid" of the inflow end face 11 or the outflow end face 12 of the honeycomb structure 100 means a centroid in geometric meaning.

Herein, further other embodiments of a honeycomb structure according to the present invention will be explained with reference to FIGS. 6 to 12. FIGS. 6 to 12 are plan views schematically showing further other embodiments of a honeycomb structure according to the present invention. In addition, FIGS. 6 to 12 show a state where the partition walls 1 (see FIG. 2) and the cells 2 (see FIG. 2) of each of the honeycomb segments 4 are abstracted. In honeycomb structures 300, 400, 500, 600, 700, 800, and 900 shown in FIGS. 6 to 12, the same components as those of the honeycomb structure 100 shown in FIGS. 1 to 4 have the same reference numbers and their descriptions are omitted.

Figure 6:
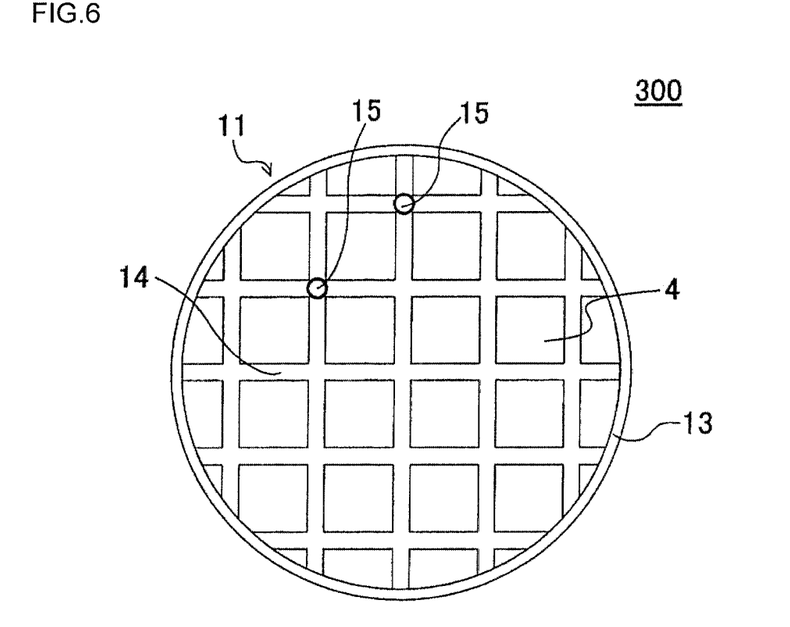
FIG. 6 is a plan view schematically showing another embodiment of the honeycomb structure of the present invention.

The honeycomb structure 300 shown in FIG. 6 is obtained by bonding up to the six honeycomb segments 4 with the bonding layers 14 in the vertical and horizontal directions of the paper space. The circumferential portions of the honeycomb segments 4 bonded with the bonding layers 14 are grounded in a circular shape, and the circumferential wall 13 is disposed to surround the grounded honeycomb segments 4. In the honeycomb structure 300 of FIG. 6, voids 15 are formed at two intersections on the inflow end face 11. One of the voids 15 is formed at an intersection located at the radially outermost circumference, and the other void 15 is formed at the next inner intersection from the intersection located at the radially outermost circumference.

Figure 7:
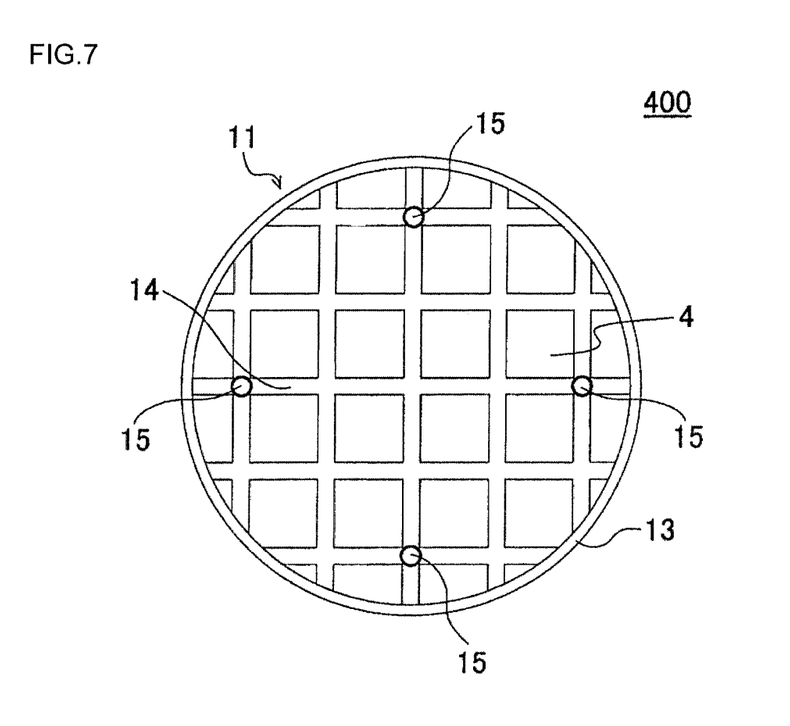
FIG. 7 is a plan view schematically showing another embodiment of the honeycomb structure of the present invention.

The honeycomb structure 400 in FIG. 7 is obtained by bonding up to the six honeycomb segments 4 with the bonding layers 14 in the vertical and horizontal directions of the paper space. In the honeycomb structure 400 of FIG. 7, voids 15 are formed at four intersections on the inflow end face 11. These four voids 15 are formed at, among the intersections located at the radially outermost circumference, all of the intersections on the extended lines that linearly extend along the bonding layer 14 from the intersection located at the centroid of the inflow end face 11.

Figure 8:
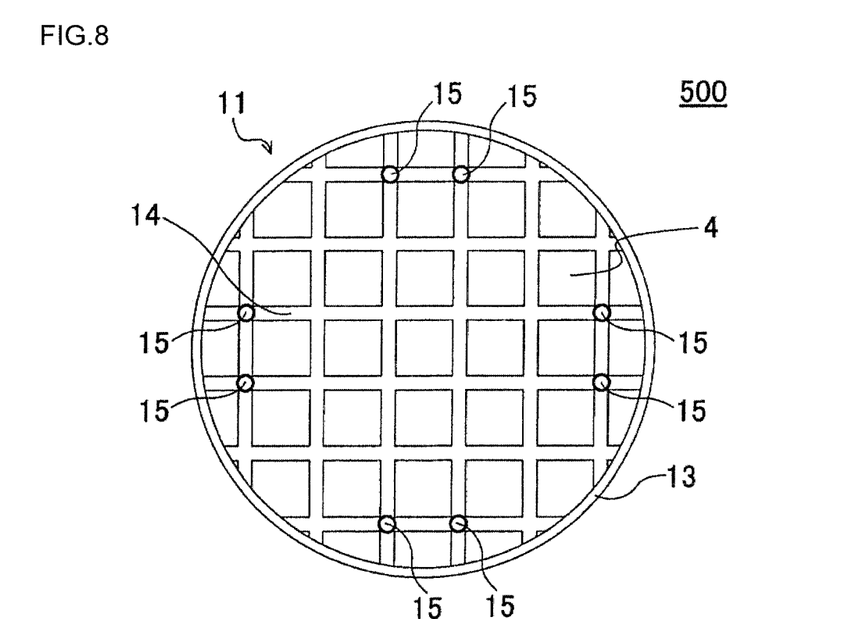
FIG. 8 is a plan view schematically showing another embodiment of the honeycomb structure of the present invention.

The honeycomb structure 500 in FIG. 8 is obtained by bonding up to the seven honeycomb segments 4 with the bonding layers 14 in the vertical and horizontal directions of the paper space. In the honeycomb structure 500 of FIG. 8, voids 15 are formed at eight intersections on the inflow end face 11. These eight voids 15 are formed at, among the intersections located at the radially outermost circumference, all of the intersections on the extended lines that linearly extend along the bonding layer 14 from the four intersections that are the closest to the centroid of the inflow end face 11.

Figure 9:
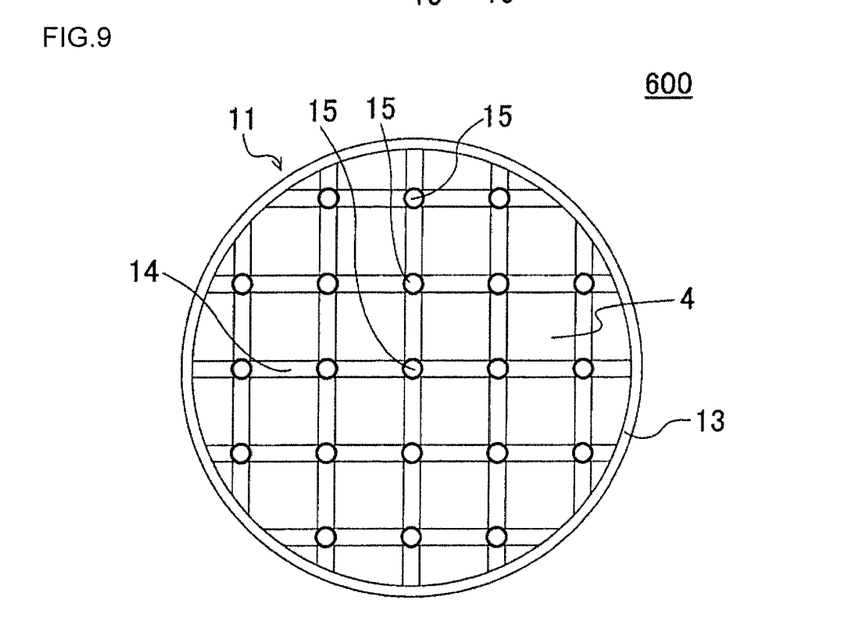
FIG. 9 is a plan view schematically showing another embodiment of the honeycomb structure of the present invention.

The honeycomb structure 600 in FIG. 9 is obtained by bonding up to the six honeycomb segments 4 with the bonding layers 14 in the vertical and horizontal directions of the paper space. In the honeycomb structure 600 of FIG. 9, voids 15 are formed at all of the intersections on the inflow end face 11.

Figure 10:
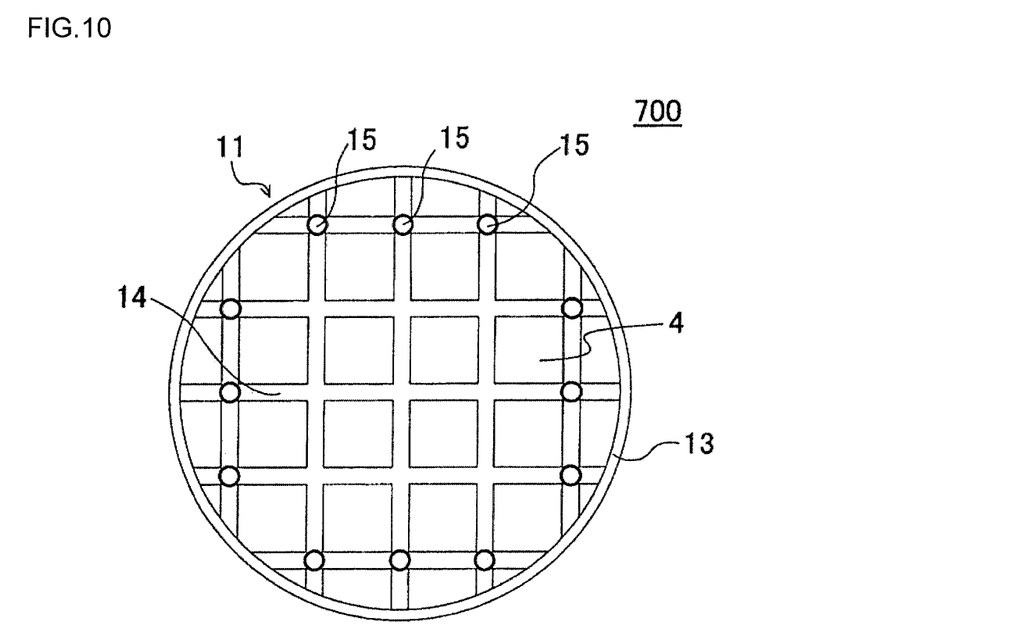
FIG. 10 is a plan view schematically showing another embodiment of the honeycomb structure of the present invention.

The honeycomb structure 700 in FIG. 10 is obtained by bonding up to the six honeycomb segments 4 with the bonding layers 14 in the vertical and horizontal directions of the paper space. In the honeycomb structure 700 of FIG. 10, voids 15 are formed at twelve intersections on the inflow end face 11. These twelve voids 15 are formed at intersections located at the radially outermost circumference.

Figure 11:
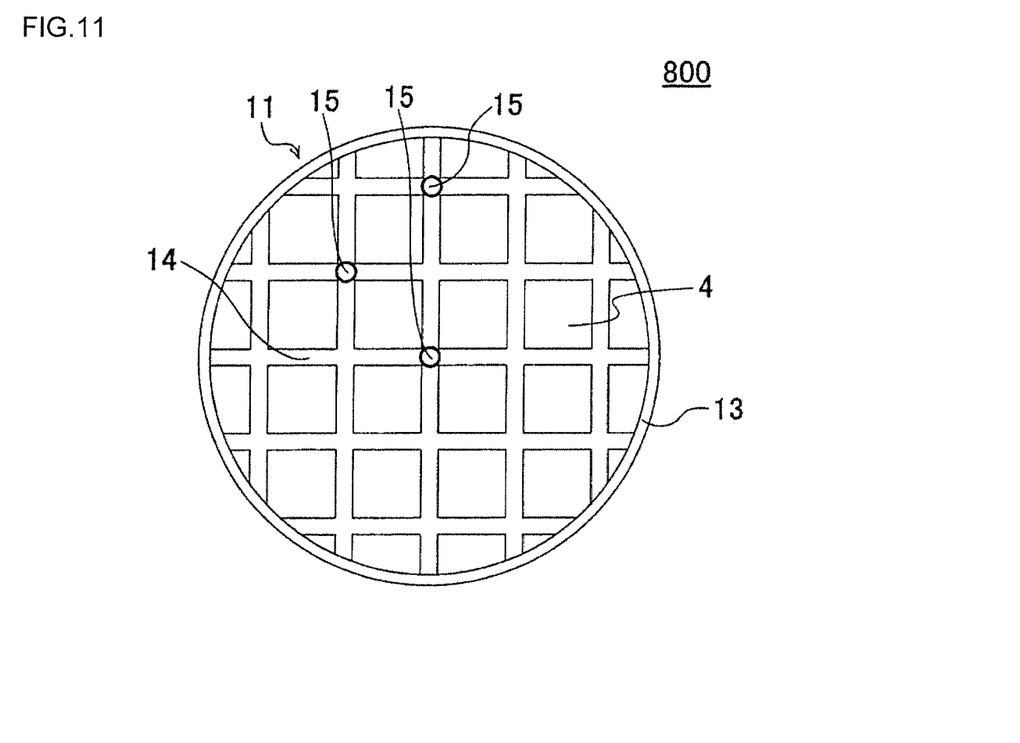
FIG. 11 is a plan view schematically showing another embodiment of the honeycomb structure of the present invention.

The honeycomb structure 800 in FIG. 11 is obtained by bonding up to the six honeycomb segments 4 with the bonding layers 14 in the vertical and horizontal directions of the paper space. In the honeycomb structure 800 of FIG. 11, voids 15 are formed at three intersections on the inflow end face 11. One of the voids 15 is formed at an intersection located at the radially outermost circumference, and another void 15 is formed at the next inner intersection from the intersection located at the radially outermost circumference. The remaining void 15 is formed at an intersection located at the center (centroid) of the inflow end face 11.

Figure 12:
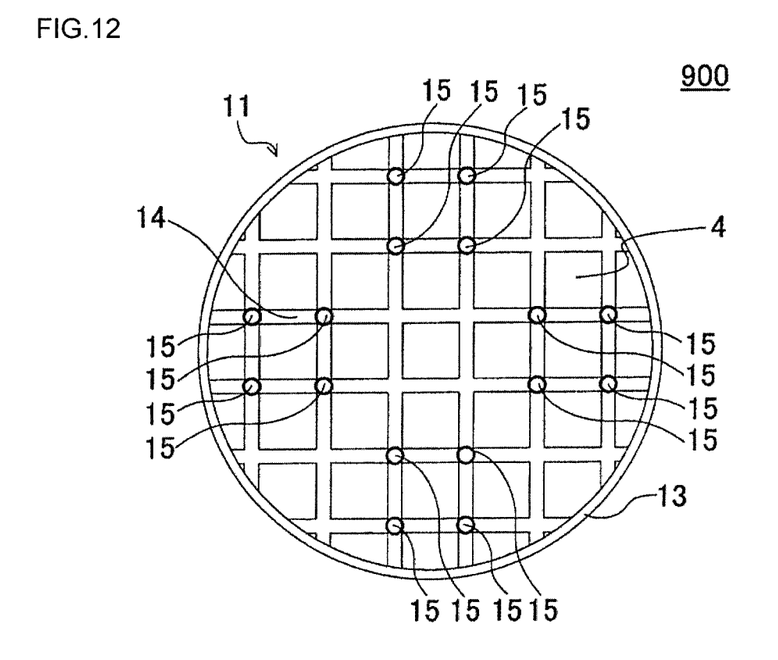
FIG. 12 is a plan view schematically showing another embodiment of the honeycomb structure of the present invention.

The honeycomb structure 900 in FIG. 12 is obtained by bonding up to the seven honeycomb segments 4 with the bonding layers 14 in the vertical and horizontal directions of the paper space. In the honeycomb structure 900 of FIG. 12, voids 15 are formed at sixteen intersections on the inflow end face 11. Eight voids of these sixteen voids 15 are formed at, among the intersections located at the radially outermost circumference, all of the intersections on the extended lines that linearly extend along the bonding layer 14 from the four intersections that are the closest to the centroid of the inflow end face 11. The remaining eight voids 15 are formed at the next inner intersections from the intersections located at the radially outermost circumference toward the centroid and along the extended lines.

In the honeycomb structure 100 of FIG. 1 to FIG. 4, a ratio of a size of an open end of each void 15 on the inflow end face 11 or the outflow end face 12 has no particular limitation. For example, a ratio of a size of an open end of each void 15 to a width of each bonding layer 14 on the inflow end face 11 or the outflow end face 12 of the honeycomb structure 100 is preferably 10 to 140%, more preferably 50 to 140%, and particularly preferably 100 to 140%. Such voids 15 can effectively suppress extension of cracks generated in the bonding layer 14. If the ratio of the size of the open ends of the voids 15 is less than 10%, the size of the open ends of the voids 15 is small relative to the width of cracks in the bonding layer 14, and thus such voids may fail to suppress the cracks well. If a ratio of a size of an open end of each void 15 exceeds 140%, the bonding strength of the bonding layer 14 may deteriorate. Note here that the "width of each bonding layer 14" means the distance between the side faces of the honeycomb segments 4 that are bonded with the bonding layer 14. The "size of an open end of each void 15" means the maximum size for an outer size of an open end of each void 15. A too large size of an open end of each void 15 is not favorable because the bonding area of the bonding layer 14 between honeycomb segments 4 reduces.

A width of each bonding layer 14 on the inflow end face 11 or the outflow end face 12 of the honeycomb structure 100 is preferably 0.5 to 2.0 mm and more preferably 0.5 to 1.5 mm. If a width of each bonding layer 14 is less than 0.5 mm, the bonding strength of the honeycomb structure 100 may deteriorate. In addition, the function to reduce stress may also deteriorate. If a width of each bonding layer 14 exceeds 2.0 mm, pressure loss of the honeycomb structure 100 may increase.

The material of the bonding layers 14 has no particular limitation and thus can use the material of bonding layers in the conventionally known honeycomb structure.

The shape of the cell 2 formed in the honeycomb segment 4 has no particular limitation. For example, the shape of the cell 2 in a cross section orthogonal to the direction of extension of the cell 2 can include a polygon, a circular shape, an elliptical shape, and the like. A polygon can include a triangle, a quadrangle, a pentagon, a hexagon, an octagon, and the like. In addition, it is preferable that the shape of the cell 2 is a triangle, a quadrangle, a pentagon, a hexagon, and/or an octagon. Moreover, in terms of the shape of the cell 2, the shapes of all the cells 2 may be the same or may be different from each other. For example, although it is not shown, quadrangular cells and octagonal cells may be mixed. Moreover, in terms of the size of the cell 2, the sizes of all the cells 2 may be the same or may be different from each other. For example, although it is not shown, among the plurality of cells, the size of some cells may be made larger and the size of other cells may be made relatively smaller.

A cell density of the cells 2 sectioned by the partition walls 1 is preferably 15 to 90 cells/cm$^2$ and is further preferably 30 to 60 cells/cm$^2$. By employing such the configuration, the honeycomb structure 100 according to the present embodiment can be preferably used as a filter for purifying exhaust gas emitted from the engine of the automobile.

The porosity of the partition walls 1 is preferably 30 to 80%, is further preferably 35 to 75%, and is particularly preferably 40 to 70%. The porosity of the partition walls 1 is a value measured by a mercury press-in method. The measurement of the porosity of the partition walls 1 can be performed by using Autopore 9500 (product name) made by Micromeritics for example. After cutting off a portion of the partition walls 1 of each of the honeycomb segments 4 to take a test piece, the measurement of the porosity can be performed by using this test piece. When the porosity of the partition walls 1 is less than 30%, the pressure loss of the honeycomb structure 100 itself may be increased and the deviation of the pressure loss after the load of a catalyst may be increased. When the porosity of the partition walls 1 exceeds 80%, strength and trapping performance of the honeycomb structure 100 as a filter may be decreased.

The shape of the honeycomb segment 4 has no particular limitation. For example, as the shape of the honeycomb segment 4, the cross-sectional shape orthogonal to the axial direction of this honeycomb segment 4 can have a prismatic columnar shape of a polygon such as a quadrangle and a hexagon. In addition, the honeycomb segments 4 disposed on the outermost circumference of the honeycomb structure 100 may have a shape in which a portion of a prismatic column is processed by grinding etc. in accordance with the entire shape of the honeycomb structure 100.

The entire shape of the honeycomb structure 100 has no particular limitation. For example, the entire shape of the honeycomb structure 100 shown in FIG. 1 is a round pillar shape in which the inflow end face 11 and the outflow end face 12 have a circular shape. Alternatively, although it is not shown, the entire shape of the honeycomb structure may be a pillar shape in which the inflow end face and the outflow end face have a substantially circular shape such as an elliptical shape, a racetrack shape, and an oval shape. Moreover, the entire shape of the honeycomb structure may be a prismatic columnar shape in which the inflow end face and the outflow end face have a shape of a polygon such as a quadrangle and a hexagon.

The materials that constitute the honeycomb segments 4 have no particular limitation, but at least one material selected from the following material group is preferable from the viewpoint of strength, heat resistance, durability, etc. The material group is a group of silicon carbide, silicon-silicon carbide based composite material, silicon nitride, cordierite, mullite, alumina, spinel, silicon carbide-cordierite based composite material, lithium aluminum silicate, aluminum titanate, and Fe—Cr—Al based metal. Among these, silicon carbide or silicon-silicon carbide based composite material is further preferable. The silicon-silicon carbide based composite material is a composite material in which silicon carbide (SiC) is aggregates and silicon (Si) is bonding materials.

The material of the plugging portion 5 has no particular limitation. For example, it is preferable that the material of the plugging portion 5 is similar to the materials illustrated as the materials that constitute the honeycomb segment 4.

The size of the honeycomb structure 100, for example, a length from the inflow end face 11 to the outflow end face 12 and the size of a cross section orthogonal to the direction of extension of the cell 2 of the honeycomb structure 100 have no particular limitation. When the honeycomb structure 100 according to the present embodiment is used as a filter for the purification of exhaust gas, it is sufficient to appropriately select each size to obtain optimum purification performance. For example, a length from the inflow end face 11 to the outflow end face 12 of the honeycomb structure 100 is preferably 150 to 305 mm, and particularly preferably 200 to 305 mm. Moreover, an area of a cross section orthogonal to the direction of extension of the cell 2 of the honeycomb structure 100 is preferably 160 to 860 $cm^2$ and is particularly preferably 300 to 560 $cm^2$.

In the honeycomb structure 100 according to the present embodiment, the plugging portions 5 are disposed in open ends of the predetermined cells 2 in the inflow end face 11 and open ends of the residual cells 2 in the outflow end face 12. The cells 2 having the plugging portion 5 at the open ends on the outflow end face 12 and that are open on the inflow end face 11 are inflow cells. The cells 2 having the plugging portion 5 at the open ends on the inflow end face 11 and that are open on the outflow end face 12 are outflow cells. It is preferable that the inflow cells and the outflow cells are alternately arranged with the partition walls 1 therebetween. Thereby, it is preferable that a checkered pattern is formed in both end faces of the honeycomb structure 100 by the plugging portions 5 and the "open ends of the cells 2".

In the honeycomb structure 100 according to the present embodiment, a catalyst may be loaded onto the partition walls 1 that forms the plurality of cells 2. To load a catalyst onto the partition walls 1 means that a catalyst is coated on the surfaces of the partition walls 1 and the inner walls of pores formed in the partition walls. By employing such the configuration, CO, NOx, HC, etc. in the exhaust gas can be converted into harmless substances by a catalytic reaction. Moreover, it is possible to promote the oxidation of PM such as the trapped soot.

(2) Method of Manufacturing Honeycomb Structure

A method of manufacturing the honeycomb structure according to the embodiment has no particular limitation. For example, the honeycomb structure can be manufactured by the following method. First, plastic kneaded material to make the honeycomb segment is prepared. The kneaded material to make the honeycomb segment can be prepared as raw material powder by appropriately adding water and an addition agent such as binder to a material selected from among preferable materials of the honeycomb segment described above.

Next, a prismatic columnar honeycomb formed body including a partition walls disposed to surround the plurality of cells and a segmented outer wall disposed on the outermost circumference is made by performing extrusion on the kneaded material obtained in this way. A plurality of the honeycomb formed bodies is made.

Plugging portions are made by drying the obtained honeycomb formed bodies by using a microwave and hot air and plugging the open ends of the cells with the same material as the material used for making the honeycomb formed bodies, for example. The honeycomb formed bodies may be further dried after making the plugging portions.

Next, the honeycomb segments are obtained by firing the honeycomb formed bodies in which the plugging portions are made. A firing temperature and a firing environment are different depending on raw materials. Those skilled in the art can select a firing temperature and a firing environment most suitable for the selected material.

Next, a segmented-structure honeycomb structure can be obtained by bonding the plurality of honeycomb segments by using a bonding material with respect to each other and drying and curing the segments and then processing the outer circumference to have a desired shape. The bonding material can use a material obtained by adding a liquid medium such as water to a ceramic material to make a paste state or a slurry state.

During the manufacturing of a honeycomb structure of the present invention, bottomed-hollow voids are formed at desired intersections of the bonding layer by the following method. Firstly while assembling a plurality of honeycomb segments with a bonding material so that their side faces are opposed, a cylindrical member having a shape similar to the shape of the void is disposed at the intersection to form the void. The cylindrical member may be made of a material that is burned out by heating at about 400° C. or higher (e.g., a cylindrical wooden material). In this way, a honeycomb segment bonded body that includes the cylindrical members at intersections is formed and then after drying and curing of the bonding material, the cylindrical members are burned out by heat treatment. In this way, bottomed-hollow voids can be formed at desired intersections of the bonding layer in which bonding material is dried and solidified. According to another method to form voids, cylindrical members are disposed at intersections to form voids similarly to the above method, and after drying and curing of the bonding material, the cylindrical members disposed at the intersections are removed to form the voids. When voids are formed by such a method, the material of the cylindrical members has no particular limitation.

Because a processed surface after the outer circumference of the honeycomb segment bonded body is processed has cells that are exposed, a circumferential wall may be formed by applying an outer coating material onto the processed surface of the honeycomb segment bonded body. The outer coating material can include a slurry state obtained by adding water and an addition agent such as organic binder, foamable resin, and dispersing agent to inorganic raw material such as inorganic fiber, colloidal silica, clay, and ceramic particles and kneading these, for example.

EXAMPLES

Hereinafter, the present invention will be more specifically explained by using Examples, but the present invention is not limited to these Examples.

Example 0.1

A mixed raw material obtained by mixing silicon carbide (SiC) powder and metallic silicon (Si) powder at a mass ratio of 80:20 was prepared as a ceramic raw material. A forming raw material was made by adding "hydroxypropyl methylcellulose as binder, water absorbable resin as pore former, and water" to the mixed raw material. The obtained forming raw material was kneaded by a kneader to obtain kneaded material.

Next, 36 square prismatic columnar honeycomb formed bodies were made by molding the obtained kneaded material by using a vacuum extruder. Each of these square prismatic columnar honeycomb formed bodies corresponds to a honeycomb segment.

Next, the obtained honeycomb formed bodies were dried by high frequency dielectric heating and then were dried at 120° C. for 2 hours by using a hot-air drying machine.

Next, plugging portions were formed in each of the honeycomb formed bodies after drying. Masking was first performed on the inflow end face of the honeycomb formed body after drying. Next, the masked end (end of inflow end face) was dipped in plugging slurry and the open ends of the unmasked cells (outflow cells) were filled up with the plugging slurry. In this way, the plugging portions were formed in the inflow end face of the honeycomb formed body after drying. Similarly, in case of the outflow end face of the honeycomb formed body after drying, plugging portions were formed in the inflow cells.

Then, the honeycomb formed body in which the plugging portions are formed was degreased and fired to obtain the honeycomb segment. The condition of the degreasing was 550° C. and 3 hours, and the condition of the firing was 1,450° C. and 2 hours under an argon atmosphere.

As described above, the honeycomb segments used for manufacturing a honeycomb structure according to Example 1 were made. In each of the made honeycomb segments, a cross section perpendicular to the axial direction had a square and the length (segment size) of one side of the square was 39 mm. These results are shown in the column of "Length (mm) of one side" of "Honeycomb segment" in Table 1. Moreover, in each of the honeycomb segments, the length of the axial direction was 203 mm.

In each of the honeycomb segments, the thickness of the partition walls was 0.305 mm and its cell density was 46.5 cells/cm$^2$. Moreover, the porosity of the partition walls was 41%. The porosity of the partition walls was measured by Autopore 9500 (product name) made by Micromeritics.

Next, a bonding material for bonding the honeycomb segments was prepared. The bonding material was prepared by adding organic binder, foamable resin and dispersing agent to inorganic raw materials and then adding water and by kneading to be in a slurry form.

Next, the obtained honeycomb segments were disposed close to each other so that their side faces were opposed mutually, and were bonded with the bonding material, followed by a heat treatment at 400° C. so as to form a honeycomb segment bonded body. During assembly of the plurality of honeycomb segments with the bonding material, cylindrical wooden members each having a shape similar to the shape of the void were disposed at the intersections to form the voids. Then the wooden members were burned out during the heat treatment to form bottomed-hollow voids at the desired intersections of the bonding layer. The wooden members used had a diameter at the end face of 1.0 mm.

As shown in FIG. 9, the honeycomb segment bonded body was made by bonding the total 36 honeycomb segments in which up to six segments in the vertical direction and up to six segments in the horizontal direction are arranged in its end face. The columns of "Number (pcs)" and "Arrangement (pcs×pcs)" in "Honeycomb segments" of Table 1 show the number and the arrangement of the honeycomb segments that are used in Examples. For example, when "6×6" is described in the column of "Arrangement (pcs×pcs)", the description means that up to the six honeycomb segments 4 in the vertical direction and up to the six honeycomb segments 4 in the horizontal direction are arranged, as shown in FIG. 9. Note here that the number of the honeycomb segments 4 including up to six in rows and up to six in columns were thirty-two in total, because no honeycomb segments 4 were disposed at four corners in rows and columns.

Next, the honeycomb structure according to Example 1 was obtained by grounding the outer circumference of the honeycomb segment bonded body in the shape of a round pillar and applying a coating material onto its outer circumferential surface. In the honeycomb structure according to Example 1, a diameter of the end face was 229 mm and a length of the axial direction was 203 mm. Moreover, In the honeycomb structure according to Example 1, a width of each of the bonding layers was 1.0 mm. Their results are shown in Table 1.

The honeycomb structure of Example 1 had twenty-one intersections of the bonding layer on the inflow end face and had voids at all of the twenty-one intersections. A void depth of each void was 20.3 mm, and a ratio of the depth of each void to the length of the honeycomb segment in the axial direction was 10%. A size of an open end of each void (i.e., diameter of each void) was 1.0 mm, and the ratio of the size of the open end of each void to the width of the bonding layer was 100%. The columns of "the number of intersections having voids (pieces)", "ratio of void depth of each void (%)" and "ratio of size of open end of each void to width of each bonding layer (%)" in the "voids of bonding layers" in Table 1 show their values. The column of "end face" in the "positions of voids" in Table 1 shows the end face of the honeycomb structure having the voids. That is, when voids are formed on the inflow end face of the honeycomb structure, the column shows the "inflow end face". When voids are formed on both of the inflow end face and the outflow end face of the honeycomb structure, the column shows the "both end faces". The column of "reference figure" in the "positions of voids" in Table 1 shows a figure to be referred to about the positions of the intersections having voids. The honeycomb structure of Example 1 had the voids 15 at all of the intersections on the inflow end face 11 as shown in FIG. 9.

For the honeycomb structure of Example 1, a test to evaluate cooling/heating vibration durability was performed by the following method, and the length of cracks at the bonding part was measured. Among the cracks at the bonding part, the length of a largest crack was the "largest crack length", and the rate (%) of the largest crack length to the overall length of the bonding part was obtained. Then evaluation was made based on the following criteria. Table 2 shows the results.

(Test to Evaluate Cooling/Heating Vibration Durability)

Thermal fluctuation and physical vibrations were applied to the honeycomb structure at the same time under the following conditions. After that, the length of cracks generated at the bonding layer on the inflow end face or the outflow end face of the honeycomb structure was measured.

Thermal fluctuation conditions: Gas at 150° C. was flowed from the inflow end face of the honeycomb structure, and the temperature of the gas was increased to 700° C. in 10 minutes. After that, the temperature of the gas was decreased to 150° C. in 10 minutes. Gas at 150 to 700° C. was flowed into the honeycomb structure for 25 hours in total while setting the passage of the gas in 20 minutes as one cycle.

Physical vibration conditions: vibrations of 100 Hz in frequency and 30 G of acceleration were applied to the honeycomb structure for 25 hours.

(Evaluations)

Cases showing that the rate (%) of the largest crack length to the overall length of the bonding part that was 50% or less were determined as "Pass". Cases showing that the rate (%) of the largest crack length to the overall length of the bonding part exceeds 50% were determined as "Fail".

TABLE 1

| | Honeycomb structure | | Honeycomb segment | | | Bonding layer | Voids of bonding layer | | | | |
|---|---|---|---|---|---|---|---|---|---|---|---|
| | Diameter (mm) | Axial length (mm) | Length of one side (mm) | The number of pieces | Arrangement (rows × columns) | Width (mm) | The number of intersections having voids (pieces) | Positions of voids | | Ratio of void depth of each void (%) | Ratio of size of open end of each void to width of each bonding layer (%) |
| | | | | | | | | End face | Reference FIG. | | |
| Example 1 | 229 | 203 | 39 | 32 | 6 × 6 | 1.0 | 21 | inflow end face | FIG. 9 | 10 | 100 |
| Example 2 | 229 | 203 | 39 | 32 | 6 × 6 | 1.0 | 21 | outflow end face | FIG. 9 | 20 | 100 |
| Example 3 | 229 | 203 | 39 | 32 | 6 × 6 | 1.0 | 12 | inflow end face | FIG. 10 | 50 | 100 |
| Example 4 | 229 | 203 | 39 | 32 | 6 × 6 | 1.0 | 3 | inflow end face | FIG. 11 | 70 | 100 |
| Example 5 | 229 | 203 | 39 | 32 | 6 × 6 | 1.0 | 4 | inflow end face | FIG. 7 | 80 | 100 |
| Example 6 | 267 | 305 | 39 | 46 | 7 × 7 | 1.0 | 8 | inflow end face | FIG. 8 | 50 | 100 |
| Example 7 | 267 | 305 | 39 | 46 | 7 × 7 | 1.0 | 8 | both end faces | FIG. 8 | 50 (25 × 2) | 100 |
| Example 8 | 267 | 305 | 39 | 46 | 7 × 7 | 1.0 | 16 | inflow end face | FIG. 12 | 15 | 100 |
| Example 9 | 229 | 203 | 39 | 32 | 6 × 6 | 1.0 | 21 | inflow end face | FIG. 9 | 10 | 140 |
| Example 10 | 229 | 203 | 39 | 32 | 6 × 6 | 1.0 | 21 | inflow end face | FIG. 9 | 10 | 10 |
| Example 11 | 229 | 203 | 39 | 32 | 6 × 6 | 1.0 | 21 | inflow end face | FIG. 9 | 10 | 50 |
| Example 12 | 229 | 203 | 39 | 32 | 6 × 6 | 1.0 | 21 | inflow end face | FIG. 9 | 5 | 100 |
| Comparative Example 1 | 229 | 203 | 39 | 36 | 6 × 6 | 1.0 | 21 | inflow end face | FIG. 9 | 3 | 100 |
| Comparative Example 2 | 267 | 305 | 39 | 46 | 7 × 7 | 1.0 | 0 | — | — | — | — |

TABLE 2

| | Rate of largest crack length to overall length of bonding part (%) | Evaluation |
|---|---|---|
| Example 1 | 14 | Pass |
| Example 2 | 14 | Pass |
| Example 3 | 14 | Pass |
| Example 4 | 50 | Pass |
| Example 5 | 14 | Pass |
| Example 6 | 14 | Pass |
| Example 7 | 14 | Pass |
| Example 8 | 10 | Pass |
| Example 9 | 14 | Pass |
| Example 10 | 50 | Pass |
| Example 11 | 32 | Pass |
| Example 12 | 14 | Pass |
| Comparative Example 1 | 100 | Fail |
| Comparative Example 2 | 90 | Fail |

Examples 2 to 12

Honeycomb structures of these Examples were manufactured similarly to Example 1 other than that the structure of the honeycomb structures was changed as shown in Table 1 and the voids at intersections of the bonding layer were changed as shown in Table 1.

Comparative Example 1

The honeycomb structure of Comparative Example 1 was manufactured similarly to Example 1 other than that the structure of the honeycomb structure was changed as shown in Table 1 and the voids at intersections of the bonding layer were changed as shown in Table 1.

Comparative Example 2

The honeycomb structure of Comparative Example 2 was manufactured similarly to Example 1 other than that the structure of the honeycomb structure was changed as shown in Table 1 and no voids were formed at intersections of the bonding layers.

Also for the honeycomb structures of Examples 2 to 12 and Comparative Examples 1 and 2, a test to evaluate cooling/heating vibration durability was performed by the method similar to Example 1, and the length of cracks at the bonding part was measured. Then the honeycomb structures were evaluated based on the above-stated criteria. Table 2 shows the results.

(Results)

It was confirmed that the honeycomb structures of Examples 1 to 12 had the effect of suppressing extension of cracks during the test to evaluate cooling/heating vibration durability as compared with the honeycomb structures of Comparative Examples 1 and 2. The honeycomb structure of Comparative Example 1 had the ratio of void depth of the voids of 3%, and hardly had the effect of suppressing extension of cracks.

The honeycomb structure of the present invention can be used as a trapping filter to remove particulates included in exhaust gas emitted from a direct injection type gasoline engine or a diesel engine, for example.

DESCRIPTION OF REFERENCE NUMERALS

1: partition wall, 2: cell, 4: honeycomb segment, 5: plugging portion, 11: inflow end face, 12: outflow end face, 13: circumferential wall, 14: bonding layer, 15, 15A: voids, 100, 200, 300, 400, 500, 600, 700, 800, 900: honeycomb structures

What is claimed is:

1. A honeycomb structure comprising:
    a plurality of prismatic columnar honeycomb segments;
    bonding layers that bond side faces of the plurality of honeycomb segments with respect to each other; and
    a circumferential wall that is disposed to surround the plurality of honeycomb segments bonded with the bonding layers in a state where the plurality of honeycomb segments are arrayed in a grid pattern, wherein
    each of the honeycomb segments includes porous partition walls disposed to surround a plurality of cells extending from an inflow end face to an outflow end face in an axial direction and a segmented outer wall disposed to surround the partition walls,
    an end of each of the cells in each of the honeycomb segments is plugged by a plugging portion at any one of the inflow end face and the outflow end face,
    the bonding layers include bottomed-hollow voids which extend toward an internal side in the axial direction from the inflow end face or the outflow end face and which are formed only at intersections that bond the honeycomb segments in the grid pattern, and
    a ratio of a depth of each void in the axial direction to a length of each honeycomb segment in the axial direction is 5% or more.

2. The honeycomb structure according to claim 1, wherein a width of each bonding layer on the inflow end face or the outflow end face of the honeycomb structure is 0.5 to 2.0 mm.

3. The honeycomb structure according to claim 1, wherein a ratio of a size of an open end of each void to a width of each bonding layer on the inflow end face or the outflow end face of the honeycomb structure is 10 to 140%.

4. The honeycomb structure according to claim 3, wherein a width of each bonding layer on the inflow end face or the outflow end face of the honeycomb structure is 0.5 to 2.0 mm.

5. The honeycomb structure according to claim 1, wherein the voids are formed at at least one of the intersections which are located at radially outermost circumference on the inflow end face or the outflow end face of the honeycomb structure.

6. The honeycomb structure according to claim 5, wherein a ratio of a size of an open end of each void to a width of each bonding layer on the inflow end face or the outflow end face of the honeycomb structure is 10 to 140%.

7. The honeycomb structure according to claim 5, wherein a width of each bonding layer on the inflow end face or the outflow end face of the honeycomb structure is 0.5 to 2.0 mm.

8. The honeycomb structure according to claim 5, wherein the voids are formed at all of the intersections on extended lines that linearly extend along the bonding layers from the intersections that are the closest to the centroid of the inflow end face or the outflow end face of the honeycomb structure.

9. The honeycomb structure according to claim 8, wherein a ratio of a size of an open end of each void to a width of each bonding layer on the inflow end face or the outflow end face of the honeycomb structure is 10 to 140%.

10. The honeycomb structure according to claim 8, wherein a width of each bonding layer on the inflow end face or the outflow end face of the honeycomb structure is 0.5 to 2.0 mm.

11. The honeycomb structure according to claim 1, wherein a remaining portion of each bonding layer at each intersection in which each void is formed, other than each void, has a length of 1.5 mm or more in the axial direction.

12. The honeycomb structure according to claim 11, wherein a ratio of a size of an open end of each void to a width of each bonding layer on the inflow end face or the outflow end face of the honeycomb structure is 10 to 140%.

13. The honeycomb structure according to claim 11, wherein a width of each bonding layer on the inflow end face or the outflow end face of the honeycomb structure is 0.5 to 2.0 mm.

14. The honeycomb structure according to claim 11, wherein the voids are formed at at least one of the intersections which are located at radially outermost circumference on the inflow end face or the outflow end face of the honeycomb structure.

15. The honeycomb structure according to claim 14, wherein a ratio of a size of an open end of each void to a width of each bonding layer on the inflow end face or the outflow end face of the honeycomb structure is 10 to 140%.

16. The honeycomb structure according to claim 14, wherein a width of each bonding layer on the inflow end face or the outflow end face of the honeycomb structure is 0.5 to 2.0 mm.

17. The honeycomb structure according to claim 14, wherein the voids are formed at all of the intersections on extended lines that linearly extend along the bonding layers from the intersections that are the closest to the centroid of the inflow end face or the outflow end face of the honeycomb structure.

18. The honeycomb structure according to claim 17, wherein a width of each bonding layer on the inflow end face or the outflow end face of the honeycomb structure is 0.5 to 2.0 mm.

19. The honeycomb structure according to claim 17, wherein a ratio of a size of an open end of each void to a width of each bonding layer on the inflow end face or the outflow end face of the honeycomb structure is 10 to 140%.

20. The honeycomb structure according to claim 19, wherein a width of each bonding layer on the inflow end face or the outflow end face of the honeycomb structure is 0.5 to 2.0 mm.

* * * * *